Nov. 23, 1926.
F. S. CARVER
1,607,722
SELF CONTAINED POT PRESS
Filed July 11, 1924    3 Sheets-Sheet 1
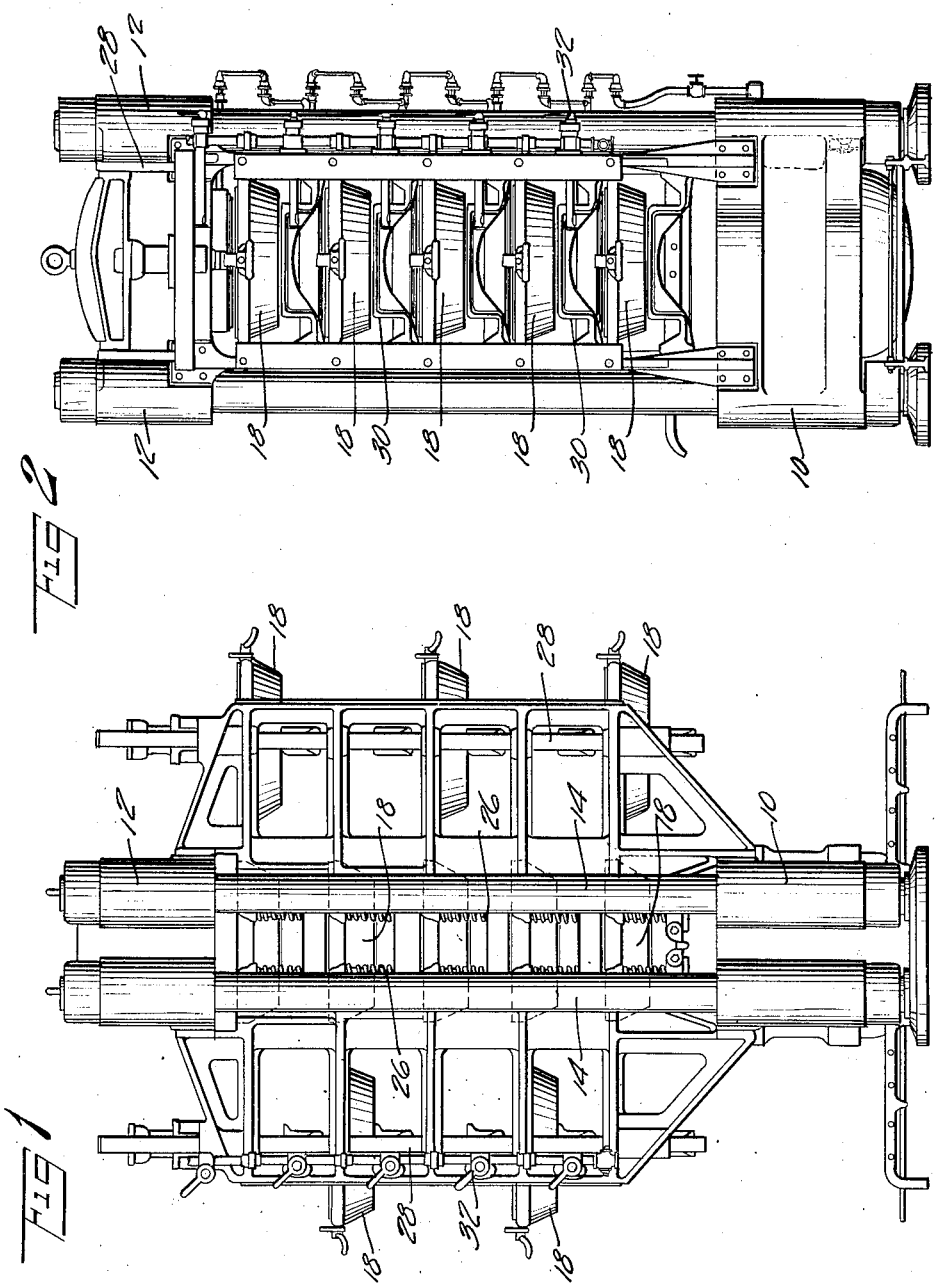
INVENTOR
Fred S. Carver
BY H. H. Dyke
ATTORNEY Nov. 23, 1926.     1,607,722
F. S. CARVER
SELF CONTAINED POT PRESS
Filed July 11, 1924     3 Sheets-Sheet 2
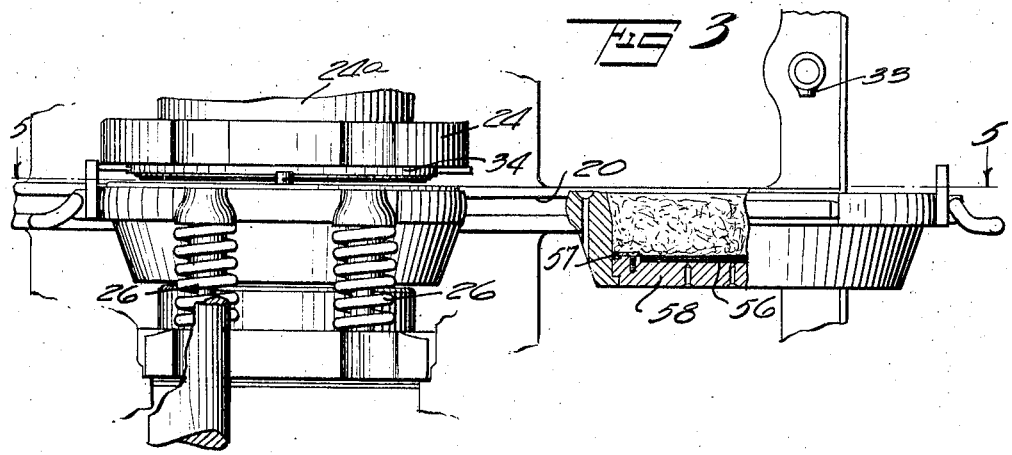
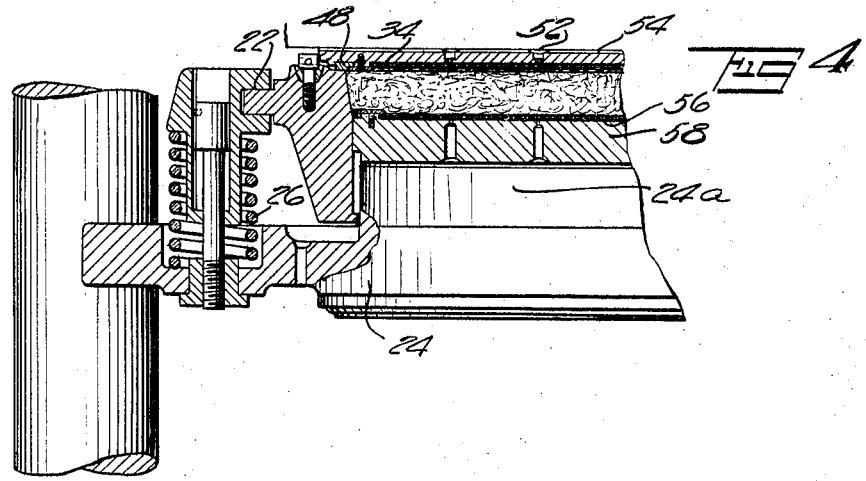
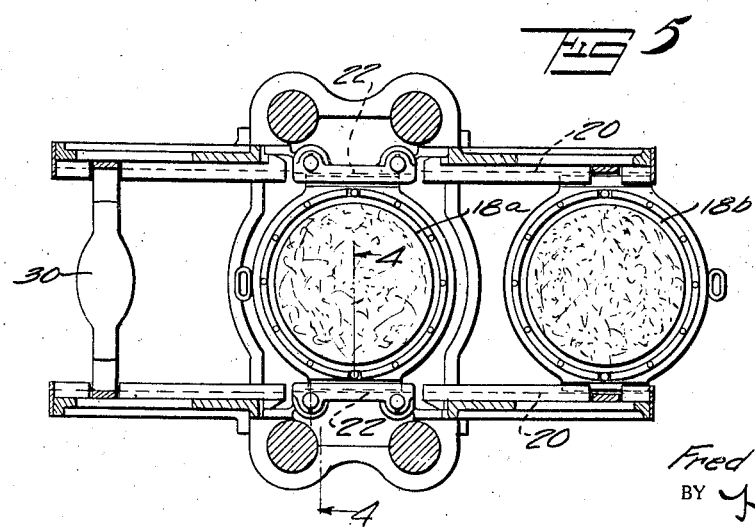
INVENTOR
Fred S. Carver
BY H. H. Dyke
ATTORNEY Nov. 23, 1926.  
F. S. CARVER  
1,607,722  
SELF CONTAINED POT PRESS  
Filed July 11, 1924  3 Sheets-Sheet 3
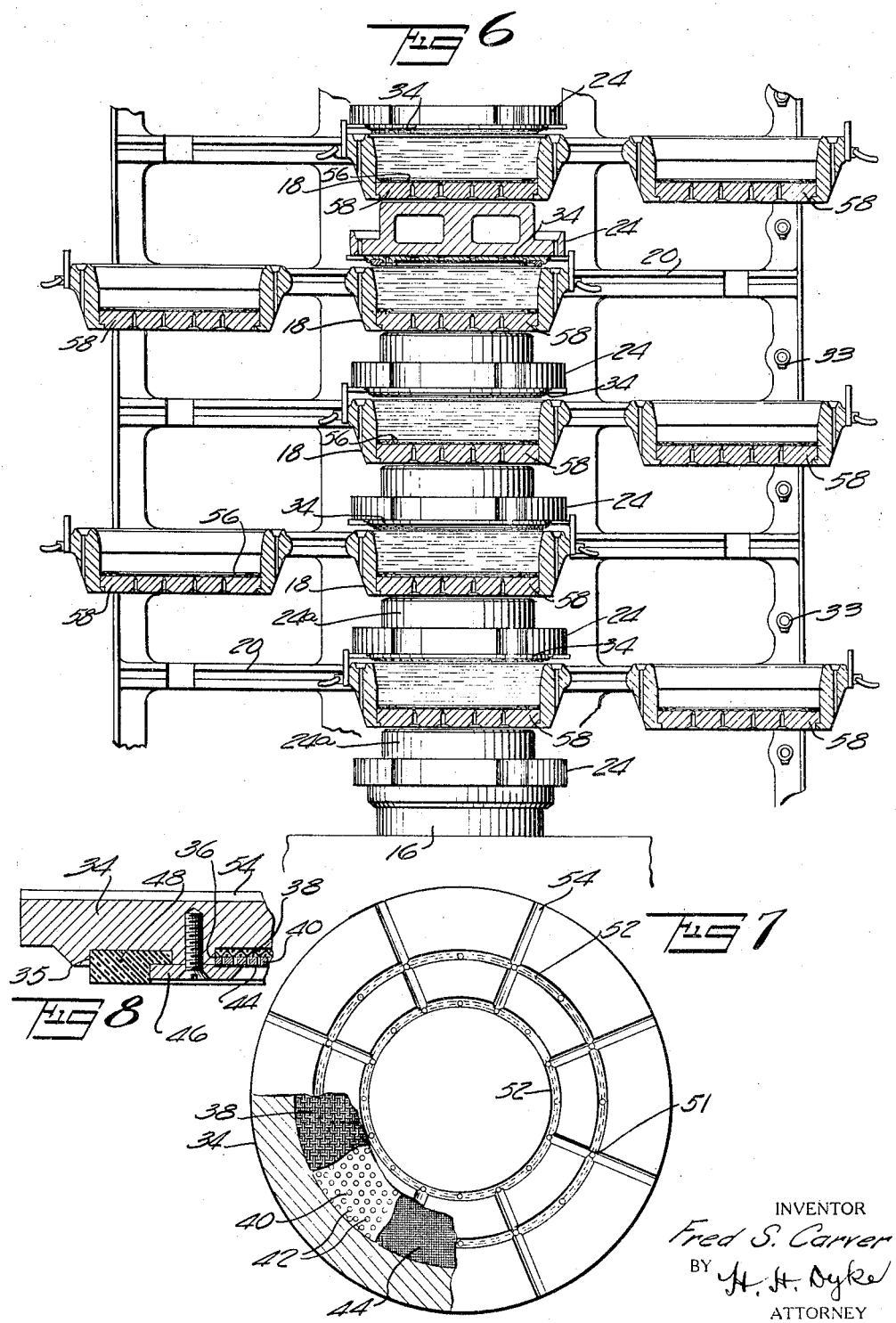

Patented Nov. 23, 1926.

1,607,722

UNITED STATES PATENT OFFICE.

FRED S. CARVER, OF EAST ORANGE, NEW JERSEY.

SELF-CONTAINED POT PRESS.

Application filed July 11, 1924. Serial No. 725,400.

My invention relates to a pot press for expressing fluids from fluid containing material charged into the press pots, and particularly to a self-contained pot press.

For affording an understanding of the invention I have illustrated herein the embodiment thereof in a cocoa press for expressing cocoa butter from ground cocoa beans, but it is to be understood that the embodiment shown is for illustration only and for affording an understanding of the invention, which can be put to a large number of uses.

In operating prior pot presses it has been necessary to make use of filter pads of camel's hair or the like material. One such pad has been put into the pot to cover the piston bottom before the pot is filled and served as a bottom filter means. Another removable filter pad or a removable plate carrying a filter pad has been put on the top of the pot after the material was charged therein and served as a top filter means. The filter pad placed on top has been larger than the one put in the pot in order that it may extend over the pot top and serve as a sealing means when the top of the pot was brought up against the press platen. In operating the press the handling of camel's hair pads has been troublesome, involving selection of the right sized pad, insertion of pads at the commencement and close of the filling operation, stripping the pads from both sides of the press cakes after the pressing operation was completed, all of which are laborious operations and slow up the press operation or take the press tender from the other operations of the press work, or both, and the wear and tear of camel's hair filter pads is very expensive.

These various objections are eliminated in the press in accordance with the present invention, in which the use of separate filter pads is entirely dispensed with, and the filter means are built into the piston pot bottom and into the press platens respectively, and simplify the features of the press operation just referred to by complete elimination of the handling of the separate camel's hair filter pads, so that all that is required in connection therewith is the mere filling of the pots prior to pressing and ejection and removal of the press cakes after pressing, with no handling of separate filter pads.

While the advantages of the present invention could be secured with other forms of filter means, which can be permanently built into the press platens and piston pot bottoms, I preferably make use of filter plates as described in my copending application Serial No. 682,823, filed Dec. 26, 1923, comprising a surface layer of fine mesh metallic filter cloth backed up by a highly foraminous metallic plate, which is in turn backed up by hard rolled coarse wire mesh affording a substantial support for the foraminated plate and providing extensive lateral egress for expressed fluid.

In the accompanying drawings, Fig. 1 is a side view of a press. Fig. 2 is an end view. Fig. 3 is a fragmentary detail view partly in section and illustrating the spring support of one of the pots in each pair from the underlying press platen. Fig. 4 is a section on the line 4—4, Fig. 5. Fig. 5 is a section on the line 5—5, Fig. 3. Fig. 6 is a diagrammatical view showing the relation of the pots in pairs to the press platens. Fig. 7 is a detail view of the preferred form of built-in filter plate for the press platens, and Fig. 8 is a cross-sectional detail view of the press platen filter plate.

Press base 10 and head 12 are connected by massive through bolts 14 to hold the head 12 down against the thrust of the hydraulic ram 16 located in the base 10.

The press pots 18 are arranged in pairs $18^a$, $18^b$, to slide in and out in slideways 20 supported in the machine framework. These slideways are in communication with the intermediate slideways 22, spring supported on the press platens 24 by the heavy coil springs 26, as shown in my Patent No. 1,478,699 of Dec. 25, 1923, automatic press. When one of the pots of a pair is in the press on the platen slideway 22, the other pot of the pair is out on the framework slideway 20, as indicated respectively at $18^a$, $18^b$, Fig. 5. When in the out position the cake is ejected by the hydraulic ejecting device indicated at 28, 30, Figs. 1 and 2 (see my Patent No. 1,486,633 of Mar. 11, 1924) and the pot is filled by turning the appropriate filling cock 32, Figs. 1 and 2, controlling the nozzle 33 located over the pot in out position. (The filling apparatus is shown in detail in my copending application Serial No. 366,364, filed Mar. 16, 1920, filling apparatus for presses.)

The preferred form of built-in filter means is shown in Figs. 3 and 4, and the filter plate as applied to the underside of the press platen is illustrated in detail in Figs. 7 and 8. The filter plate 34, which is secured to the underside of the press platen is chambered out or recessed on its under face, as indicated at 36, and is provided in the recess with the following parts in the order indicated: the backing disk 38 of hard roller coarse wire mesh, the plate 40 of foraminous sheet metal with closely spaced holes 42, and the fine mesh wire filter cloth 44, all held in place by the ring 46 screw fastened to the plate 34. A sealing ring 48 of material such as bronze, fibre or the like is inserted in a groove 35 provided in the filter plate 34, and by projecting from the groove serves to seal the opening about the pot top when the latter is raised by the ram 16 acting through the springs 26 into contact therewith. The spring supports compensate for any irregularity or unevenness in closing and enable the pot to seat itself automatically against the sealing ring 48 all the way around and to make a complete sealing engagement without leaks at any point.

The expressed fluid passes out through the wire mesh filter cloth 44 and the holes in the sheet metal 40, and being distributed laterally through channels in the coarse mesh material 38 is discharged through the holes 51 and discharge ducts or channels 52, 54 in the plate 34.

The built-in filter means 56 for the piston pot bottoms 58 are practically identical with the built-in filter means just described for the press platens, being, however, of course, reversed to bring the filter mesh into contact with the material charged into the press pot, and having a suitable packing ring 57, as of leather or the like, at the edge. Filter means constructed as described do not stick to the cake as is the case with the usual fibrous pads heretofore used.

The operation will be readily understood. In the form shown there are five of the platens 24 equipped with the built-in filter means on their under sides, and ten of the press pots 18 with the piston pot bottoms 58 equipped with the built-in filter means 56. The five built-in filter means of the five press platens are in use at each pressing operation, whereas but five of the ten built-in filter piston pot bottoms—or one-half of the total ten—are in use at any pressing operation, and the remaining five thereof are in the pots 18, which are out on the runways 20 for cake ejection and filling. As the platens are elevated by the ram 16, the pots 18 are carried up by their supporting springs 26 and are self-seating in sealing engagement with the sealing ring 48 in the platen filter plates, and the springs 26 being compressed by a further rising of the ram 16 the plungers $24^a$ on the press platens 24 serve to elevate the piston pot bottoms 58 and to force the liquid portion of the contents thereof through the built-in filter means in both the piston pot bottoms and the press platens.

In operation, therefore, the pots are filled, pushed in, pressed, withdrawn, and the cakes ejected and taken away, nothing being handled by the press operator but the cake.

As is stated above, the built-in filter means shown herein are illustrative only, and the advantages of the present invention may be realized with other forms of built-in filter means, whereby the press is made a self-contained apparatus and the supplying and handling of separate filter means is dispensed with.

I claim:

1. A pot press of the type wherein pots with piston bottoms are adapted to be interposed between press platens, characterized in that both the piston pot bottoms and the press platens comprise built-in filter means, making the press self-contained and dispensing with the use of separate filter pads.

2. In a press, a series of press platens having spring supporting means for supporting press pots thereabove, guide means for the platens, a series of pots with piston bottoms, said pots being adapted to be supported by said spring supporting means, said piston pot bottoms and the under part of said platens being provided with built-in filter means, and means for applying pressure to the platens with the pots between them, whereby prior to expression of the fluid contents of the pots the springs are first compressed to automatically bring the pot tops into self-adjusting sealing engagement with the filter means on the under side of the press platens, and the press is made self-contained and use of separate filter pads dispensed with.

In testimony whereof, I have signed my name hereto.

FRED S. CARVER.